United States Patent [19]

Nagai et al.

[11] Patent Number: 5,004,320
[45] Date of Patent: Apr. 2, 1991

[54] ANTI-REFLECTION DEVICE FOR A VDT

[75] Inventors: Takao Nagai; Hiromi Kusano, both of Itami, Japan

[73] Assignee: Mitsubishi Denki Kabushiki Kaisha, Japan

[21] Appl. No.: 279,798

[22] Filed: Dec. 5, 1988

[30] Foreign Application Priority Data

Dec. 10, 1987 [JP] Japan .................................. 62-314617

[51] Int. Cl.$^5$ .............................................. G02B 27/00
[52] U.S. Cl. .................................. 350/276 R; 350/284; 358/252
[58] Field of Search .................... 313/478; 350/276 R, 350/276 SL, 278, 284, 164; 358/252, 254; 49/388, 390

[56] References Cited

U.S. PATENT DOCUMENTS 3,676,955  7/1972  Schacht .................................. 40/390
4,235,048  4/1980  Gillery .................................. 49/390
4,428,154  1/1984  Rinehart ................................ 49/390
4,577,928  3/1986  Brown ............................... 350/276 R
4,593,493  6/1986  Naka et al. ............................ 49/248

Primary Examiner—Bruce Y. Arnold
Assistant Examiner—J. P. Ryan
Attorney, Agent, or Firm—Leydig, Voit & Mayer

[57] ABSTRACT

An anti-reflection device for a VDT has an anti-reflection film for minimizing the amount of light reflecting on the surface of the screen of a CRT display and at least two frames, including an inner frame in which the anti-reflection film is stretched and an outer frame encircling the inner frame and attached to a display frame formed around the screen of the CRT display. The inner frame is supported for rotation about a non-horizontal axis and can be fixed at a desired angular position, thereby enabling the angle of the surface of the anti-reflection film to be adjusted to minimize reflection.

17 Claims, 3 Drawing Sheets

ANTI-REFLECTION DEVICE FOR A VDT

BACKGROUND OF THE INVENTION

This invention relates to an anti-reflection device for a VDT (visual display terminal) which is attached to a CRT display frame.

FIGS. 1 and 2 show the construction of a conventional anti-reflection device for a VDT in plan and in section. The VDT anti-reflection device 15 shown in FIGS. 1 and 2 is used to limit reflection of incident light 11 from a light source (not shown). The amount of reflected light 12 reflecting from a glass screen surface 10 of a CRT (cathode ray tube) display is about 4.25% of the amount of incident light 11. Reflected light is the greatest cause of fatigue on a VDT operator's eyes, which is a considerable problem in offices. To minimize the amount of reflected light 12, a VDT anti-reflection device 15 is attached to a frame 9 of the CRT display screen 10. However, a certain amount of light 12a is also reflected from the surface of an anti-reflection film 6, and it is impossible to change the direction of this reflected light 12a since, as shown in FIGS. 1 and 2, the frame 14 in which the anti-reflection film 6 of the VDT anti-reflection device 15 is stretched is fixed to the frame 9 of the CRT display by adhesive tape 8. As shown in FIG. 2, the screen 10 of the CRT display is inclined at about 10° so that it faces slightly upwards. The light 11a emitted by the light source (not shown) and reflected as light 12a by the anti-reflection film 6 therefore tends to travel toward the eye 13 of the VDT operator. Other anti-reflection techniques are known, including a multi-coating method in which a glass plate on which an anti-reflection film is formed by vapor deposition is attached to the screen surface of the CRT display with a transparent resin, a sand blast method in which irregularities are formed in the screen surface of the CRT display by blowing sand against the surface, and a direct etching method in which irregularities are formed by blowing hydrofluoric acid against the screen surface of the CRT display. All of these methods employ direct processing of the screen of the CRT display. Such surface processing reduces the transparency of the screen while failing to completely eliminate reflection.

The above-discribed conventional VDT anti-reflection device 15 has the additional problem that light 12a reflected from the anti-reflection film 6 is directly visible depending upon the disposition of the CRT display and the light source. Also, none of the multi-coating methods, sand blast methods or direct etching methods can change the direction of the reflected light 12 from the screen 10 of the CRT display.

SUMMARY OF THE INVENTION

In view of these problems, it is an object of the present invention to provide an anti-reflection device for VDT in which the angle of the anti-reflection film can be changed by the VDT operator.

An antireflection device for a VDT according to the present invention has an anti-reflection film for minimizing the amount of light reflecting off the surface of the screen of a CRT display frame in which the anti-reflection film is fitted. The frame is supported for rotation about a 2 non-horizontal axis. The inner frame may be connected with an outer frame by a rotary shaft whereby the angle of the surface of the antireflection film can be freely changed.

The VDT anti-reflection device in accordance with the present invention may also include an angle fixing means for fixing the anti-reflection film at a desired angular position.

DESCRIPTION OF THE PREFERRED EMBODIMENTS

Embodiments of the present invention will be described below with reference to the accompanying drawings.

Figure 4:
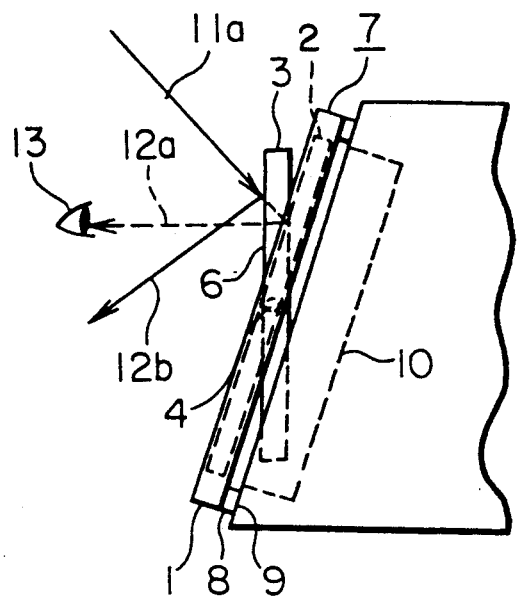
FIG. 4 is a side view of the anti-reflection device shown in FIG. 3.
Figure 5:
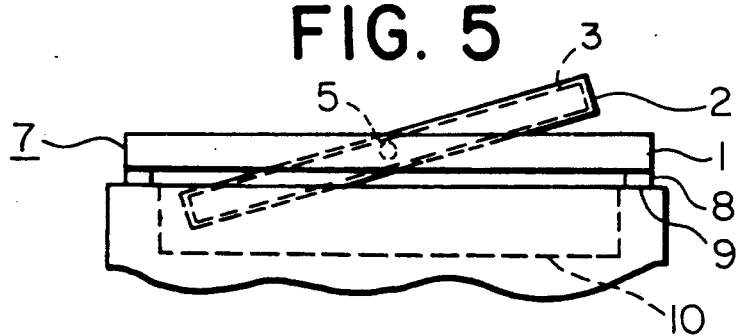
FIG. 5 is a top view of the anti-reflection device shown in FIG. 3.
Figure 3:
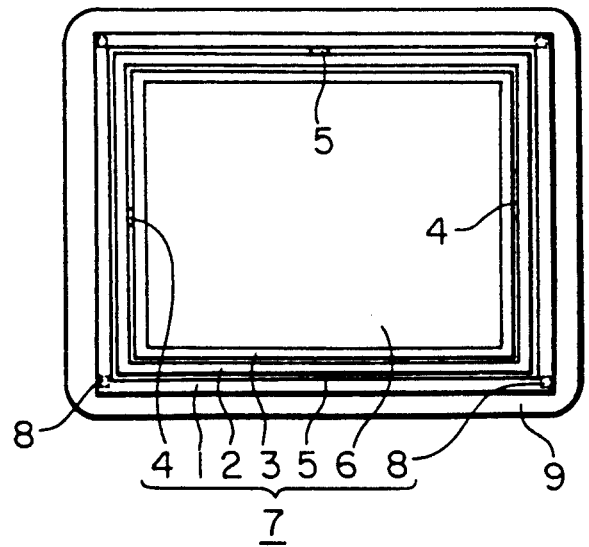
FIG. 3 is a front view of an embodiment of an anti-reflection device for a VDT according to the present invention.

FIGS. 3 to 5 show an embodiment of as anti-reflection device 7 for a VDT according to the present invention. FIG. 3 is a front view of this device, FIG. 4 is a side view, and FIG. 5 is a top view. The VDT anti-reflection device 7 has an outer frame 1 which is fixed to a frame 9 of a CRT display by adhesive tape 8. A pair of vertical rotary shafts 5 are provided between the outer frame 1 and an intermediate frame 2 of the VDT anti-reflection device 7 at the centers of upper and lower sides of each frame. The inner portion of the intermediate frame 2 encircled by the outer frame 1 has a contour generally the same as that of the screen 10 of the CRT display so that the intermediate frame 2 can be rotated about the shafts 5, that is, about a generally vertical axis relative to the outer frame 1 without contacting the frame 9 of the CRT display. A pair of lateral rotary shafts 4 are provided between the intermediate frame 2 and an inner frame 3 at the centers of left and right sides of each frame so that the inner frame 3 can rotate about these shafts 4, that is, about a horizontal axis. An anti-reflection film 6 is stretched in the inner frame 3 and is used to minimize the amount of light from a light source reflected by the screen 10 of the CRT display. To maximize the area of the anti-reflection film 6, the gaps between frames 1 and 2 and between frames 2 and 3 are set to be not greater than 5 mm while the distance between the outer and inner edges of the intermediate frame 2 and inner frame 3 is set to be not greater than 1 cm. If, as shown in FIG. 4, the light source (not shown) is higher than the screen, it is possible to makes the rays of reflected light 12a deviate from the eye 13 of the operator as represented by reflected light 12b by making the anti-reflection film 6 vertical If the light source is placed in a position laterally shifted relative to the screen, it is possible to shift the rays of reflected light 12a by rotating the anti-reflection film 6 clockwise or counterclockwise.

Figure 6:
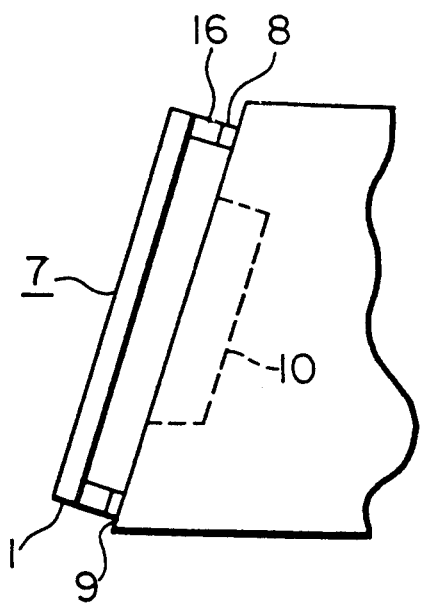
FIG. 6 is a side view of another embodiment of an anti-reflection device for a VDT according to the present invention.
Figure 1:
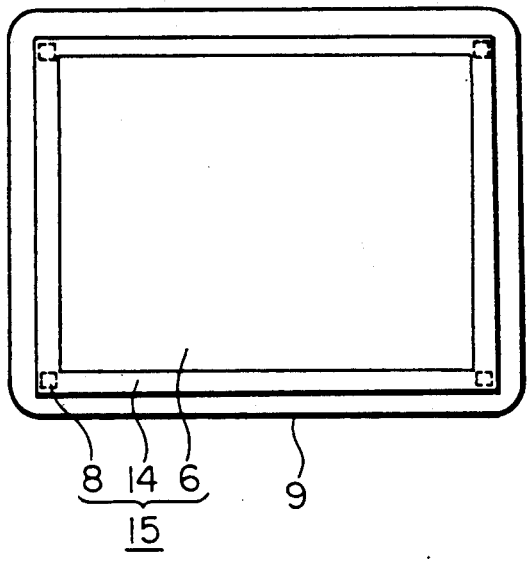
FIG. 1 is a front view of a conventional anti-reflection device for VDT.
Figure 2:
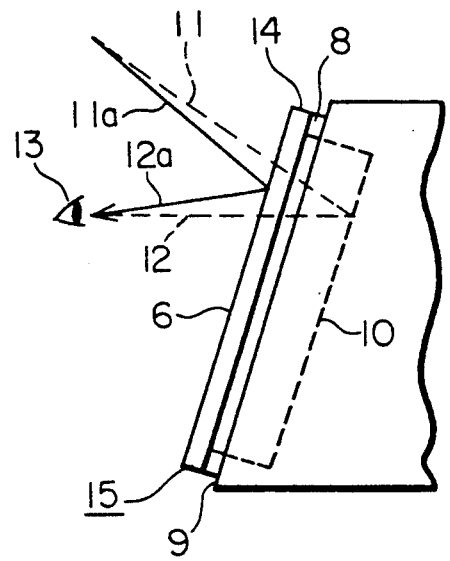
FIG. 2 is a side view of the anti-reflection device shown in FIG. 1.

In this embodiment, because of lack of space between the frame 9 of the CRT display and the VDT anti-reflection device 7, the intermediate frame 2 strikes against the frame 9 of the CRT display so that the rotation of the VDT anti-reflection device 7 is limited unless the inner portion encircled by the outer frame 1 of this device has the same contour as that of the screen 10 of the CRT display or is smaller than the screen. For this reason, a spacer 16 may be disposed between the adhesive tape 8 and the outer frame 1 of the VDT anti-reflection device 7, as shown in FIG. 6.

In the above-described embodiment, a pair of vertical rotary shafts 5 is provided between the outer and intermediate frames 1 and 2 at the centers of the upper and lower sides thereof while a pair of lateral rotary shafts 4 is provided between the intermediate and inner frames 2 and 3 at the centers of the left and right sides thereof. Instead, a pair of lateral rotary shafts 4 may be provided between the outer and intermediate frames 1 and 2 at the centers of the left and right sides thereof while a pair of vertical rotary shafts 5 are provided between the intermediate and inner frames 2 and 3 at the centers of the upper and lower sides thereof. It is also possible to employ only the outer and inner frames 1 and 3 to form a two-frame structure without using the intermediate frame 2, with vertical rotary shafts or lateral rotary shafts being provided between these frames.

The connection means for the VDT anti-reflection device in accordance with the present invention includes an angle fixing means for fixing the anti-reflection film 6, that is, the intermediate frame 2 or the inner frame 3 at a desired angle relative to the outer frame 1. One of the simplest examples of this angle fixing means will be described below with respect to the inner and intermediate frames 3 and 2 and lateral rotary shafts 4 interposed therebetween. A portion of each lateral rotary shaft 4 on the sides of the inner frame 3 is fixed to the inner frame 3 while a portion of the lateral rotary shafts 4 on the side of the intermediate frame 2 is rotatably inserted into a hole (not shown) formed in the intermediate frame 2. The inner frame 3 is thereby made rotatable relative to the intermediate frame 2, but the inner frame and, hence, the anti-reflection film 6 can be fixedly maintained at a desired angular position by virtue of the friction between the holes of the intermediate frame and the shafts 4.

Figure 7A:
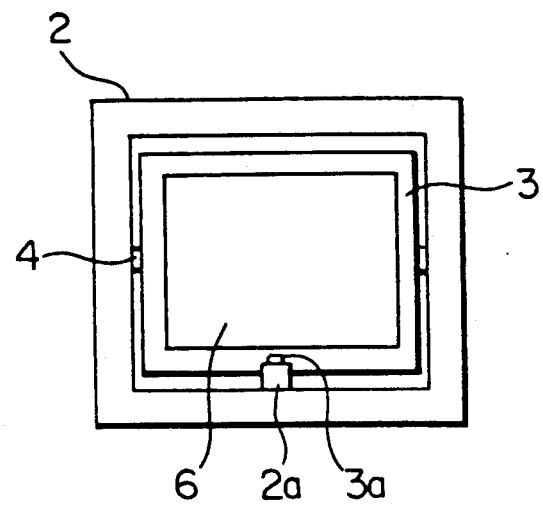
FIG. 7A is a front view of an angle fixing means.
Figure 7B:
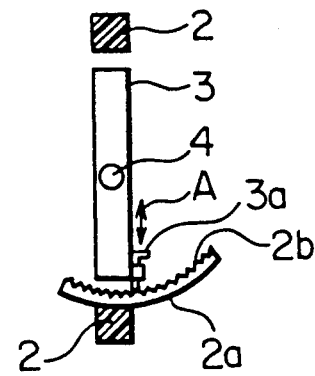
FIG. 7B is a side view of the angle fixing means shown in FIG. 7A, in which part of the intermediate frame is omitted.

FIGS. 7A and 7B show another example of the angle fixing means. FIG. 7A is a front view and FIG. 7B is a side view in which a part of the intermediate frame 2 is omitted. In this example, a guide member 2a is provided on, for example, the intermediate frame 2 and a latching device 3a is provided on the inner frame 3. A movable member of the latching device 3a is slidable in the direction of arrow A and is constantly urged toward the outside of the frame by the force of a spring (not shown). The tip of this movable member engages with an engagement portion 2b of a guide member 2a provided on the intermediate frame 2, thereby fixing the inner frame 3 and, hence, the anti-reflection film 6 at a desired angular position.

Figure 8A:
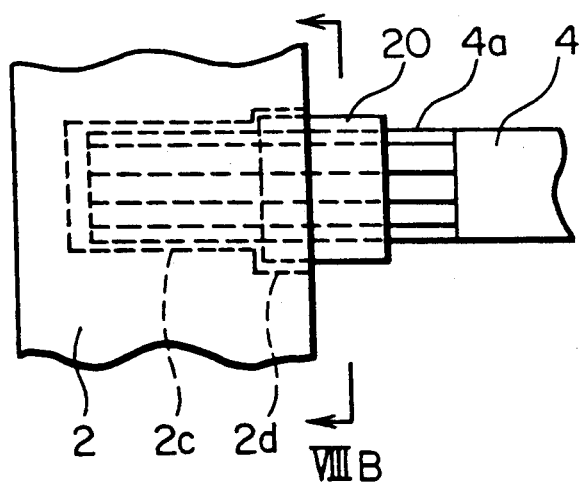
FIG. 8A is a front view of another angle fixing means.
Figure 8B:
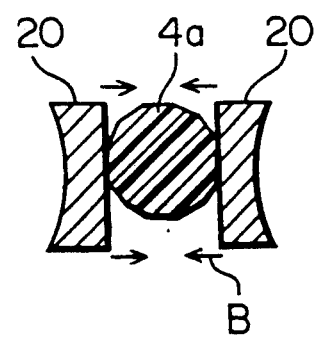
FIG. 8B is a cross-sectional view taken along Line VIIIB of FIG. 8A.

FIGS. 8A and 8B show a still another example of the angle fixing means. FIG. 8A is a front view of the angle fixing means illustrating portions of the intermediate frame 2 and the lateral rotary shaft 4, and FIG. 8B is a cross-sectional view taken along the Line VIIIB of FIG. 8A. One of the shafts 4 has a portion 4a in the form of a prism such as a dodecagonal prism formed on the side of its one end to be inserted into the intermediate frame 2. The prism portion 4a is rotatably inserted into a hole 2c formed in the intermediate frame 2. Spring-fitting portions 2d into which springs 20 for retaining the prism portion 4a of the shaft 4 from opposite sides are fitted are formed at the opening end of the hole 2c of the intermediate frame 2. The prism portion 4a is pressed by the force of the springs 20 from opposite sides in the direction of arrow B in FIG. 8B so that it is fixed at a desired position, thereby fixing the shaft 4 and, hence, the inner frame 3 at a desired angular position. Both the lateral rotary shafts 4 on the opposite sides may be provided with mechanisms of this type.

The arrangements of the two types of angle fixing means shown in FIGS. 7A and 7B and FIGS. 8A and 8B exemplify cases where such means are applied to the lateral rotary shafts 4 between the inner and intermediate frames 3 and 2. However, the present invention is not limited to these cases and it is possible to provide the vertical rotary shafts 5 with the same angle fixing means. The type of angle fixing means selected depends upon the structure of the frames (dual-frame structure or three-frame structure) or upon particular requirements.

In accordance with the present invention, as described above, an operator can freely change the angle of the surface of an anti-reflection film so that the rays of reflected light do not strike his eyes. Therefore, the operator can view the CRT display under improved conditions.

What is claimed is:

1. An anti-reflection device comprising:
   a visual display terminal having a screen;
   a first frame mounted on the visual display terminal over the screen;
   a second frame rotatably supported by the first frame for rotation about a non-horizontal axis; and
   an anti-reflection film mounted on the second frame.

2. An anti-reflection device as claimed in claim 1 further comprising:
   a shaft having a first end secured to one of the frames and a second end journaled by the other of the frames, the second end of the shaft having a multi-faced polygonal cross section; and
   a spring which is mounted on one of the frames and exerts an elastic force on a face of the second end of the shafts.

3. An anti-reflection device as claimed in claim 1 further comprising:
   a latch mounted on one of the frames; and
   a guide member having an irregular surface extending along the path of rotation of the frame on which the latch is mounted and engaging with the latch.

4. An anti-reflection device as claimed in claim 1, further comprising a spacer disposed between the first frame and the visual display terminal and supporting the first frame on the visual display terminal.

5. An anti-reflection device for a visual display terminal having a screen comprising:
   a first frame for mounting on a visual display terminal;
   a second frame disposed inside the first frame;
   an anti-reflection film mounted on the second frame; and
   a third frame disposed between the first frame and the second frame, the second frame being rotatably supported by the third frame for rotation about a first axis and the third frame being rotatably supported by the first frame for rotation about a second axis which is orthogonal to the first axis.

6. An anti-reflection device as claimed in claim 5 wherein the third frame has a contour which is generally equal to the contour of the screen of the visual display terminal.

7. An anti-reflection device as claimed in claim 5, wherein both axes are substantially parallel to the screen of the visual display terminal and one of the axes is substantially horizontal.

8. An anti-reflection device as claimed in claim 5, wherein the first frame surrounds the third and the third frame surrounds the second frame.

9. An anti-reflection device as claimed in claim 8 wherein the first and third frames are separated by a gap of at most 5 mm, the third and second frames are separate by a gap of at most 5 mm, and the second and third frames each have an inner and an outer edge which are separated by at most 1 cm.

10. An anti-reflection device as claimed in claim 5 further comprising:
   first and second shafts coaxially disposed with respect to the first and second axes, respectfully, each shaft having a first end secured to one of the frames and a second end journaled by another of the frames, the second end of each shaft having a multifaced polygonal cross section; and
   a plurality of springs, each of which is mounted on one of the frames and exerts an elastic force on a face of the second end of one of the shafts.

11. An anti-reflection device as claimed in claim 5 further comprising:
   a latch mounted on one of the frames; and
   a guide member having an irregular surface extending along the path of rotation of the frame on which the latch is mounted and engaging with the latch.

12. An anti-reflection device for a visual display terminal comprising:
   an inner frame rotatably supported by a visual display terminal for rotation about a non-horizontal axis; and
   an anti-reflection film mounted on the inner frame.

13. An anti-reflection device as claimed in claim 12 further comprising an outer frame which can be secured to the visual display terminal and which surrounds the inner frame and rotatably supports the inner frame for rotation about a nonhorizontal axis.

14. An anti-reflection device as claimed in claim 13 further comprising an intermediate frame disposed between the inner frame and the outer frame, the intermediate frame rotatably supporting the inner frame for rotation about a first axis and the outer frame rotatably supporting the intermediate frame for rotation about a second axis which is orthogonal to the first axis.

15. An anti-reflection device for a visual display terminal comprising:
   an outer frame for mounting on a visual display terminal;
   an intermediate frame surrounded by the outer frame and rotatably supported by the outer frame for rotation about a first axis;
   an inner frame surrounded by the intermediate frame and rotatably supported by the intermediate frame for rotation about a second axis which is orthogonal to the first axis; and
   an anti-reflection film mounted on the inner frame.

16. An anti-reflection device as claimed in claim 15 wherein one of the axes is not horizontal.

17. An anti-reflection device comprising:
   a visual display terminal having a screen;
   an outer frame secured to the visual display terminal over the screen;
   an intermediate frame disposed inside the outer frame and rotatably supported by the outer frame for rotation about a first axis;
   an inner frame rotatably supported by the intermediate frame for rotation about a second axis orthogonal to the first axis; and
   an anti-reflection film mounted on the inner frame.

* * * * *